Jan. 7, 1969                H. E. ADAMS                3,420,101
                   FLOW VELOCITY AND DIRECTION SENSOR
Filed Oct. 22, 1965                                Sheet 1 of 5
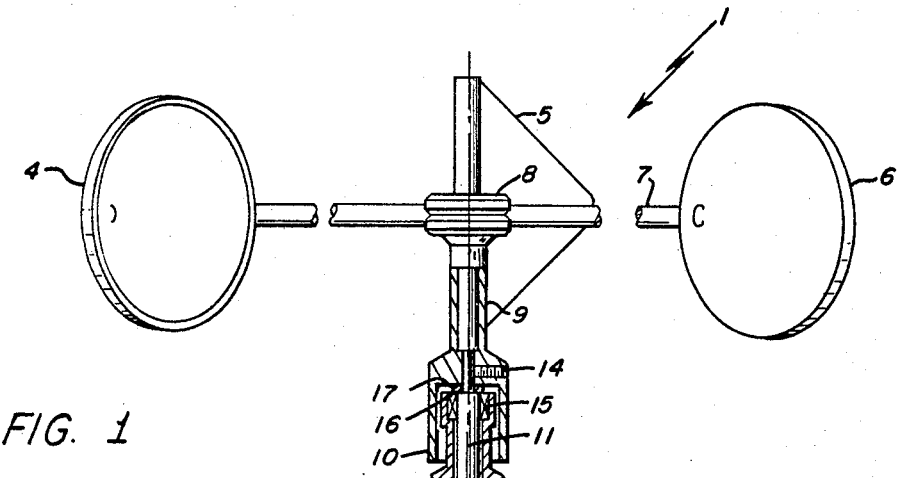
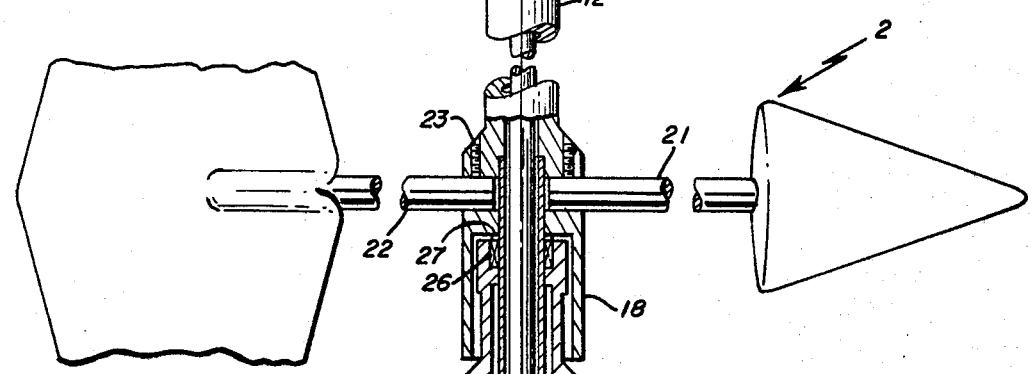
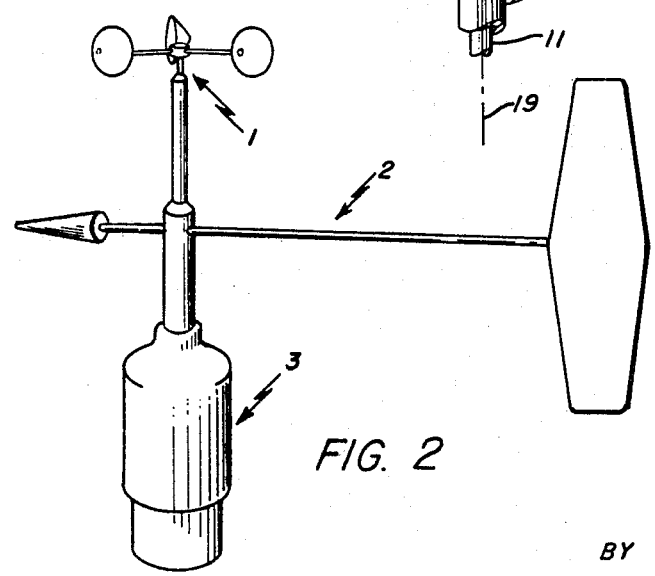
FIG. 1
FIG. 2
INVENTOR
HARRY E. ADAMS
BY Robert T. Dunn
ATTORNEY

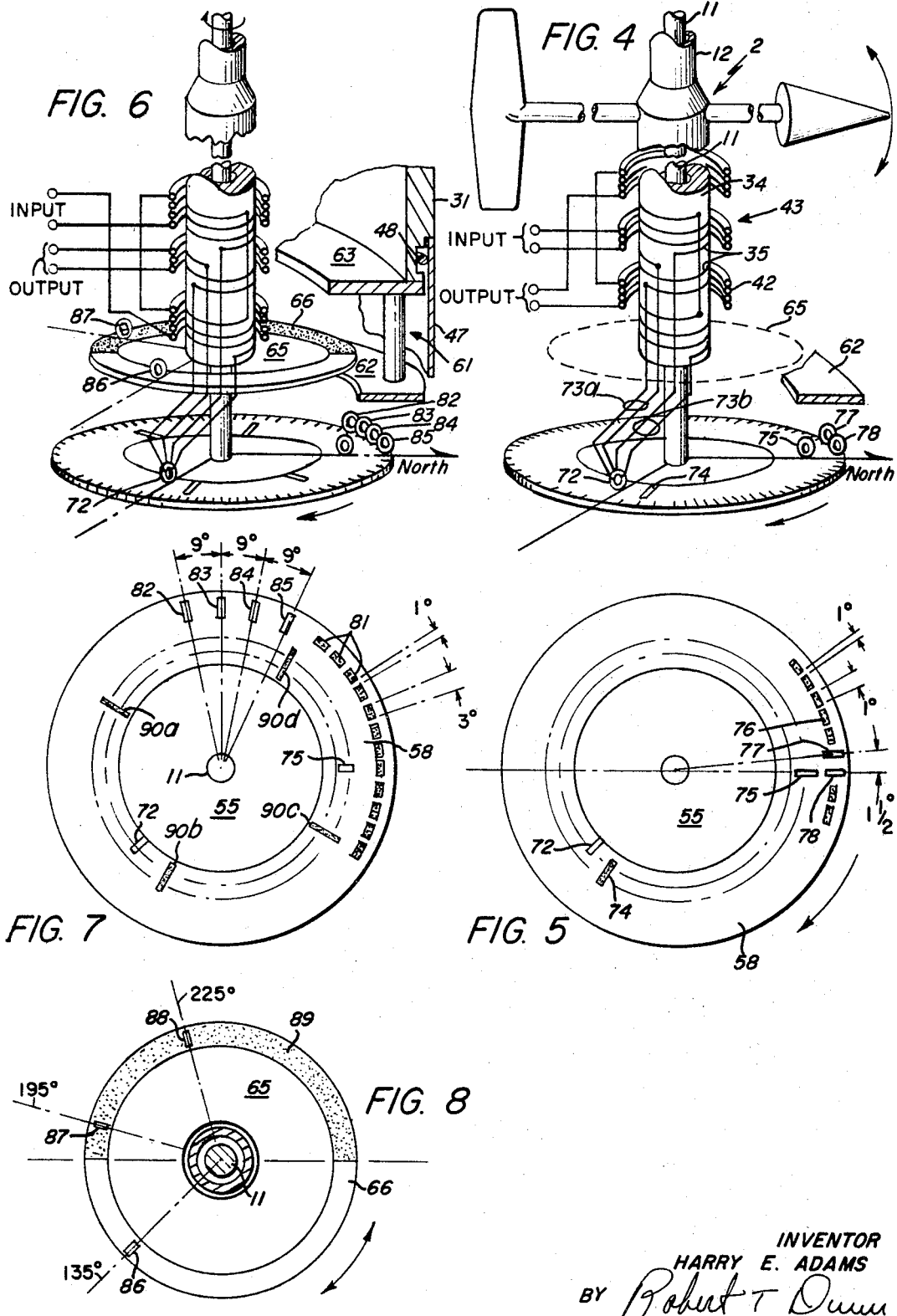

Jan. 7, 1969    H. E. ADAMS    3,420,101

FLOW VELOCITY AND DIRECTION SENSOR

Filed Oct. 22, 1965    Sheet 5 of 5

INVENTOR.
HARRY E. ADAMS
BY
ATTORNEY

United States Patent Office 3,420,101
Patented Jan. 7, 1969

3,420,101
FLOW VELOCITY AND DIRECTION SENSOR
Harry E. Adams, Needham, Mass., assignor to Control Equipment Corporation, Needham Heights, Mass., a corporation of Massachusetts
Filed Oct. 22, 1965, Ser. No. 501,319
U.S. Cl. 73—189                10 Claims
Int. Cl. G01w 1/02

ABSTRACT OF THE DISCLOSURE

A fluid (wind) velocity and direction detector produces pulses at a rate indicative of wind velocity by a set of wind velocity driven indices passing a fixed detector and also produces signals defining an interval during which a count of the pulses is indicative of wind direction. The interval defining signals are produced by wind velocity driven indices passing a moveable detector which is positioned by wind direction.

---

This invention relates to fluid flow sensors and more particularly to wind velocity and direction sensors so constructed to produce pulse signals representative of wind velocity and wind direction.

Heretofore, fluid flow measuring devices have been employed which combine transducers for measuring fluid flow velocity and direction. The well-known anemometer and wind vane mounted on concentric shafts is an example of such a device. Wind sensors of this type are ideally suited for meteorological research as well as for observation of wind about an airport and the like. Heretofore, a variety of techniques have been employed for obtaining signals representative of the wind velocity and direction from the concentric shafts on which the anemometer and wind vanes are mounted. In most of these, the rotational speed of the anemometer and the position of the wind vane are measured independently and there is no cooperation between them to produce either the signal representing wind speed or the signal representing wind direction.

It is often desirable that the wind sensor produce digital type electrical signals representing the wind velocity and direction. This is particularly useful when the wind sensor feeds information to a digital computer system which collects and stores meterological data. Since the wind sensors are often located at remote positions a substantial distance from the computer storage facility, it it preferred that the electrical signals representing wind velocity and direction be transmitted from the sensor to the storage facility in a digital form. Accordingly, it is necessary that the analog information from the anemometer and vane shafts be converted in the wind sensor at the remote location to digital signals. Heretofore, some efforts have been made to accomplish this by employing within the wind sensor structures which cooperate with the rotational motion of the anemometer shaft to produce pulses which repersent wind speed and a second structure which cooperates with the wind vane shaft to produce pulses representing wind direction. This latter structure has included a motor for driving certain parts in rotation on an axis concentric with the wind direction shaft to produce signals representing the position of the direction shaft, and thus, the direction of the wind. Thus, in the past, velocity and direction shafts are each parts of separate independent systems each for producing electrical signals and a motor is required operating in cooperation with the wind direction shaft to produce the signals representing wind direction. This motor can be a source of failure and/or improper operation particularly in view of the range of temperature and humidity conditions under which such wind sensors are operated. In addition, power must be supplied to the motor and this adds to the difficulties. It is one object of the present invention to provide a wind sensor for producing electrical signals representing wind velocity and direction wherein the above difficulties and disadvantages of prior systems are avoided.

It is another object to provide such a wind sensor in which all mechanical motion is derived from the wind.

It is another object of the present invention to provide a wind sensor including an anemometer and a wind direction vane which connect with cooperating parts therein to produce electrical signals representing both wind velocity and direction.

It is another object of the present invention to provide a wind sensor including an anemometer and wind direction vane for driving parts which cooperate in such manner as to produce digital signals representing wind velocity and direction.

It is another object of the present invention to provide a wind sensor for location at a remote station for generating and transmitting to a control location, sets of digital pulses which may be counted at the control location to determine wind velocity and direction at the remote location.

In accordance with principal features of the present invention, an anemometer and a wind vane are mounted on separate independently rotating shafts. At least one of the shafts positions a circular body having angular markings or indices thereon while the other shaft positions a moveable detector or pick-up which cooperates with the indices to produce an electrical pulse each time the pick-up comes in coincidence with one of the indices. Other pick-ups fixed in position relative to both shafts also produce pulses as the indices come into coincidence therewith. A count of pulses produced by one of the fixed pick-ups represents wind velocity and a count of the pulses produced by the moveable pick-up attached to the wind direction shaft, between intervals determined by pulses from another of the fixed pick-ups represents wind direction.

In preferred embodiments of the present invention, the anemometer and wind direction vane are mounted on concentric shafts which rotate freely with respect to each other and with respect to a housing. The anemometer shaft, called the speed shaft, rotates a disk attached to the end thereof upon which are two sets of angularly spaced indices. The first set of indices are relatively closely spaced and cooperate with a pick-up fixed to the housing to produce pulses as each index passes adjacent thereto. Meanwhile, another pick-up attached to the housing and still another carried by the wind direction shaft cooperate with a second set of indices each to produce pulses upon coming into coincidence with each index of the second set. These pulses derived from the second set of indices serve to initiate and terminate a count of pulses derived from the first set so that such a count represents wind direction. A count of the pulses over a fixed interval represents wind velocity.

The above mentioned count is preferably formed at a control or receiver location to which the pulses from the wind sensor are transmitted. Accordingly, it is convenient to transmit along separate channels the pulses produced from each of the pick-ups and to employ these separate channels of pulses at the receiver in conjunction with suitable computer equipment to derive the above mentioned counts to obtain wind velocity and direction. Thus, the wind sensor mechanism need only be energized sufficiently to produce the pulses when the detectors or pick-ups come into coincidence with the two sets of indices. No additional power need be supplied to the wind sensor because the wind itself provides the necessary mechanical power to drive the various parts which cooperate to produce the pulses.

The pick-ups mentioned above which cooperate with the indices on the disk to produce the pulses may be any of a number of well-known in the art. For example, in preferred embodiments described herein, each pick-up includes a small ferrite core energized by high frequency AC current, and the indices on the disk are comprised of magnetized spots on a suitable ferrite material. When the core comes into close coincidence with each of the magnetized spots, coupling between the primary and secondary coils of the core is substantially altered and so a pulse is produced in the high frequency carrier in the secondary and these are the pulses mentioned above. In accordance with another suitable technique, each pick-up could be a photo cell and the indices could be openings or apertures in the disk through which light is projected to the photo cell. The output of each photo cell would constitute pulses in coincidence with the passage of each aperture past the photo cell. Obviously, there are other techniques known in the art which could be employed to produce the pulses. However, for various reasons which will be apparent herein, it is preferred to produce the pulses employing the ferrite core with primary and secondary windings, operating in conjunction with magnetized spots on a surface of highly permeable magnetic material on the disk to produce the pulses.

Another embodiment of the present invention includes all the features above and in addition includes a second disk attached to the wind direction shaft and including magnetically permeable material on portions thereof which cooperate with magnetic core pick-ups attached to the housing and positioned so that the number of these pick-ups which are simultaneously in registry with the magnetically permeable material on the disk is indicative of the wind direction quadrant. These cores produce signals which are transmitted to the receiver at the control location and which initiate logic computation to determine the quadrant in which the wind direction lies at any particular instant.

Other features and objects of the present invention will be apparent from the following specific description taken in conjunction with the figures in which:

FIGURE 1 is a three-quarter view of the complete wind sensor assembly;

FIGURE 2 is a sectional view illustrating the anemometer, wind direction vane and the coaxial speed and direction shafts;

FIGURE 4 is a pictorial representation of a part of the mechanism within the housing to illustrate mechanical and electrical cooperation between parts in a simplified embodiment of the invention;

FIGURE 5 illustrates the two sets of magnetized spots on the speed disk attached to the speed shaft of the FIGURE 4;

FIGURE 6 is a pictorial diagram of an embodiment including a sextant disk attached to the direction shaft for determining the quadrant of wind direction;

FIGURES 7 and 8 illustrate the speed disk attached to the speed shaft and the sextant disk attached to the direction shaft to show the spots thereon and the relative positions of the core pick-ups which cooperate with the spots to produce the various pulses and signals;

Figure 3:
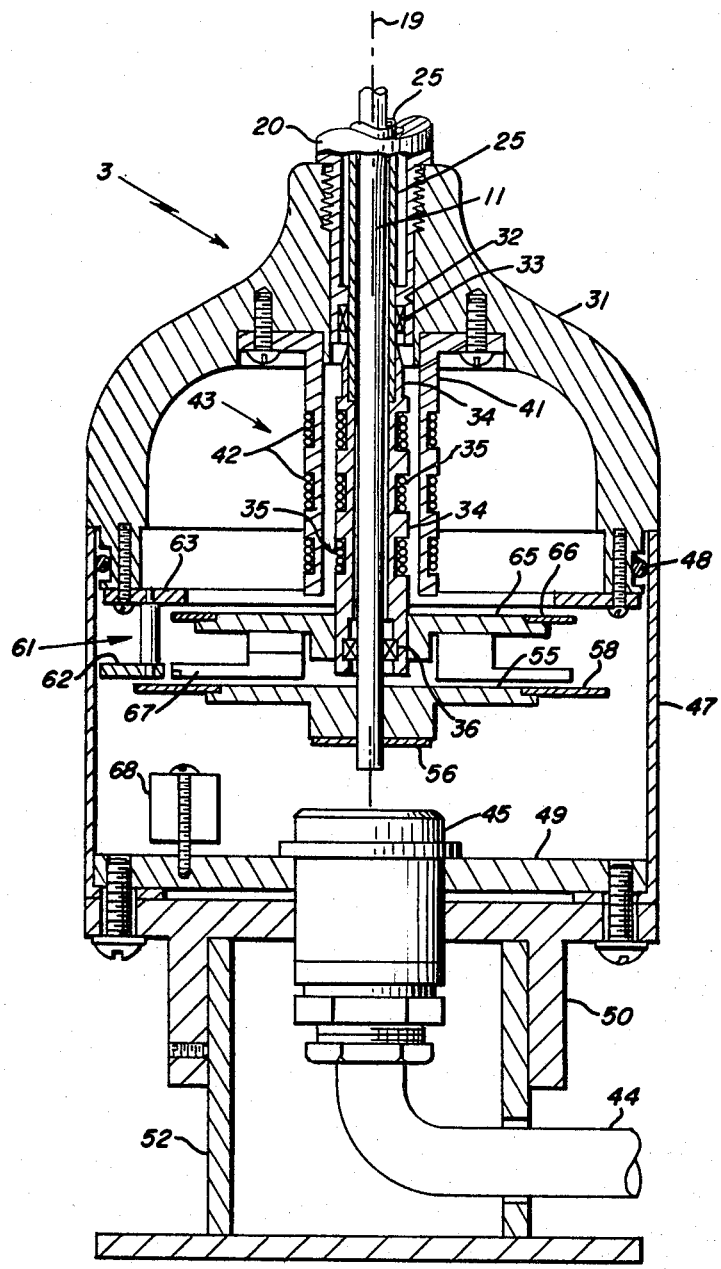
FIGURE 3 is a sectional view showing the wind sensor housing and internal mechanisms whereby the transmitted pulses are produced which represent wind direction and velocity.

Turning first to FIGURE 1 there is shown a three-quarter view of the complete wind sensor transducer package including anemometer 1, wind direction vane 2, and housing 3, containing mechanical and electrical parts which cooperate to produce electrical pulses which are transmitted from the sensor to a control location. At the control location, wind speed and wind direction are computed from the pulses. The wind sensor, as shown in FIGURE 1, is a compact sealed unit capable of enduring the most extreme weather conditions and operating entirely without mechanical power applied thereto, except via the wind.

The sectional view in FIGURE 2 illustrates details of the concentric speed and direction shafts upon which the anemometer and wind direction vane are mounted. The anemometer cups 4, 5, and 6 each mounted on a rod such as 7 are supported by the anemometer shaft holder 8 so that the rods 7 extend therefrom in equally spaced angular directions. The holder is attached to the holder shaft 9 which extends to the cup holder skirt 10 and is concentric with both the speed shaft 11 and the vane holder shaft 12. The speed shaft 11 is fixed to the holder shaft 9, and, thus, to the anemometer 1 by, for example, a set screw 14 in the holder shaft 9 which engages the speed shaft. The vane holder shaft 12 which is concentric with the speed shaft is spaced from the speed shaft and rotatably attached thereto via ball bearing 15. A spacer 16 and truarc ring 17, or its equivalent, are disposed at the end of the holder shaft to space the shaft from the inner top portion of the cup holder skirt 10. Thus, the anemometer is free to rotate on the speed shaft 11 independent of rotation of the vane holder shaft 12.

The vane holder shaft extends to the vane holder skirt 18 which encloses one end of the shaft housing 20. Extending from the vane holder shaft just above the skirt are the vane arms 21 and 22 which attach to the vane head and vane tail, respectively. These arms are secured to the vane holder shaft by set screws, such as set screw 23, which engage the arms. Concentric with the vane holder shaft and fixedly attached thereto is the direction shaft 25. The shaft housing 20 extends within the skirt 18 and is suitably spaced therefrom and is also spaced from the direction shaft 25 and rotatably connected to the direction shaft 25 by a ball bearing 26 so that the wind direction vane 2, vane holder shaft 12, skirts 18 and direction shaft 25 are free to rotate relative to the fixed shaft housing 20. A spacer 27 is disposed between the end of the shaft housing 20 and the top inside of the skirt 18 to insure suitable clearance therebetween, permitting free rotation of the skirt about the housing. Thus, extending below the wind direction vane 2 are three concentric shafts on the axis 19. The first is the shaft housing 20 which is fixed and within that are the direction shaft 25 and speed shaft 11 both free to rotate relative to each other and relative to the housing.

FIGURE 3 illustrates the lower portion of the wind sensor; more particularly, it is a sectional view of the housing part 3 and illustrates the mechanical and electrical parts contained therein for producing the pulses representing wind velocity and direction. Most of the parts shown in this figure are figures of revolution about the axis 19. The shaft housing 20 attaches to the relatively heavy housing member 31 by, for example, threading thereto in an opening 32 at the top of the housing. The lower end of the direction shaft 25 rotatably engages the lower end of the shaft housing 20 via a ball bearing 33 and, thus, the direction shaft is supported at two points via ball bearings 33 and 26 by the shaft housing 20. From this point of support the direction shaft 25 extends as the rotary transformer core 34 which carries on the outside thereof the rotor windings 35. A fourth bearing 36 at the end of the core 34 rotatably engages the speed shaft 11 and, thus, the speed shaft is supported at two points relative to the direction shaft via the bearings 15 and 36 and both the speed and direction shafts are carried by the shaft housing 20 which is fixed to the housing 31.

The rotary transformer stator base cylinder 41 attached rigidly to the housing 31 encircles the core 34 and windings 35 and carries on the outside thereof the stator windings 42. The stator windings 42, rotor windings 35 and core 34 combine to form the rotary transformer unit 43 which couples the electrical signals from a movable ferrite core pick-up which rotates with the direction shaft to an electrical transmission line 44 which is fixed to the housing and carried therefrom via the amphenol plug 45.

The lower part of the housing assembly 3 is formed by base cover cylinder 47 which attaches to the bottom of the housing 31 and is sealed thereto via O-ring 48. The attachment here may be a forced fit or clamps may be imposed about the base cover to insure a tight seal between the cover and the housing. At the bottom of the cover is the base plate 49 to which the base cover 47 attaches and which engages and supports the amphenol plug 45. A support member such as base support 50 which is screwed onto the base plate 51 may be provided for enclosing the plug 45 and for carrying a mounting plate 51 with transmission line cover 52 attached thereto and engaging a part of the base support so that the plug and one end of the transmission line are enclosed and secured from the weather.

Both of the embodiments illustrated by the diagrams in FIGURES 4 through 8 include a speed disk 55 attached to the end of speed shaft 11 and fixed thereto by jam nut 56. The outer periphery of the speed disk 55 consists of a ring 58 of ferrite material or magnetically permeable material such as barium ferrite upon which are imposed by magnetizing, discreet spots wherein the ferrite material is magnetized and, as will be seen later, two sets of such spots are spaced about the ring 58. Magnetic pick-up devices such as ferrite core transformers are disposed just above the sets of spots so that as the spots pass the cores, electrical signals are produced in the core windings. These core transformers are carried by a fixed support structure 61. This structure includes a speed disk pick-up support 62 and a direction disk pick-up support 63.

The wind direction disk 65 is attached to the end of the direction shaft 25 and carries at the periphery thereof a ring 66 of ferrite material upon which is imposed a magnetized area which couple with a number of core pick-ups carried by the upper support 63. These are the sextant pick-up transformers. Also carried by the disk 65 is a moveable support 67 which in turn carries the moveable stop core pick-up in proximity with the magnetized disk 58 on the speed shaft. The primary and secondary windings for this stop core pick-up connect directly to the stator windings 35 of the rotary transformer 43 which in turn couple inductively to the stator windings 42.

None of the core pick-up transformers nor any of the wiring connected thereto is shown in FIGURE 3, but all connect to wires leading to the amphenol plug and transmission cable 44 and all are energized by an input line also carried by the cable and which connect to the line transformer 68 from which all the core pick-up transformers are energized.

FIGURES 4 and 5 illustrate the electrical and mechanical cooperation between parts within the housing constructed and operated in accordance with a simplified embodiment of the invention. In this embodiment, the moveable stop pick-up core 72 which is carried by the support 67 suspended below the direction disk 65 has its primary and secondary windings 73a and 73b, respectively, connected as shown to the rotor windings 35 carried by the speed shaft 11 and, as already described, electrical energy is carried to and from these rotor windings via the rotary transformer stator windings 42. The pick-up 72 is positioned close to the ferrite disk 58 and couples magnetically to the magnetized start-stop spot 74 on the ferrite disk. A fixed start core pick-up 75 also couples to spot 74 and is carried by the support 62 which attaches directly to the housing. A second set of magnetized spots on the ferrite disk denotes the degree spots 76 disposed on a different radius than the start-stop spot and spaced about one degree apart, magnetically couple with the pair of fixed degree pick-ups 77 and 78 which are also carried by the support 62. Thus, the four core transformer pick-ups 72, 75, 77 and 78 all couple magnetically with spots on the disk 58 attached to the speed shaft 11. In this embodiment, the direction disk 65 plays no part except as a support for the moveable pick-up 72.

Operation of the embodiments illustrated in FIGURES 4 and 5 is preferably with the housing disposed in a given position relative to a given direction. For example, the pick-ups 75 and 78 which are fixed relative to the housing are oriented in line with the northly direction. Since the transformer 77 is positioned one and a half degrees from transformer 78, a pulse will be produced by transformer 77 one and a half degrees of rotation of the disk 55 before each pulse produced by the pick-up 78. The only purpose of the pulse from pick-up 77 is to clear the binary circuit triggered by pulses from pick-up 78 before each of the pulses from pick-up 78 arrives at the circuit. Thus, pick-up 77 could be dispensed with without eliminating any of the fundamental features of operation. In this embodiment, it is only necessary to count the pulses from pick-up 78 or pick-up 77. This count is performed during a fixed calibrated interval and represents wind velocity. Meanwhile these same pulses from transformer 78 are also counted during another interval called the direction count interval. This is the interval between which a pulse is generated by pick-up 75 followed by a pulse from pick-up 72. A count of the number of pulses from transformer 78 during this direction interval indicates the relative radial position of the moveable transformer 72 and, thus, the direction of the vane relative to the north. Suitable computer and counting equipment located at a control location to which the pulses are transmitted serve to accomplish these counts and present indications of wind velocity and direction.

Turning next to the FIGURES 6 to 8 there is shown additional structure whereby a more sophisticated embodiment of the invention is obtained. In this embodiment, the direction disk attached to the direction shaft is employed in conjunction with a number of additional pick-up transformer cores. Furthermore, the technique for detecting the degree spots to produce uniform pulses representative of minute rotations of the speed disk 55 is more complicated in order to avoid errors and permit the use of coarser degree spots without degradation in the accuracy of the degree spot count.

As shown in FIGURE 7, the degree spots 81 are $\theta$ degrees wide. For example, $\theta$ is three degrees. Thus, they are three times as wide as the degree spots in the embodiment in FIGURE 5. The spots 81 are separated from each other by one degree. In order to count every degree of rotation of the disk 55 by counting these degree spots 81, it is necessary to employ M fixed pick-up cores which are separated from each other by $(M-1)\ \theta$ degrees and which may be mounted to the support 62 at any radial position within the housing. For example, when θ is three degrees, four such cores 82 to 85 are mounted as shown in FIGURE 7 nine degrees apart. The pulses produced by each of these cores 82 to 85 energize suitable logic circuitry at the control location to produce one degree pulses. The circuitry for accomplishing this will be described with reference to subsequent figures herein.

The embodiment in FIGURES 6 to 8 also employs three fixed sextant pick-up core transformers 86 to 88 which are spaced 60 degrees from each other as shown in FIGURE 8. The sextant pick-ups are coupled magnetically with a magnetized strip 89 along one half of the ferrite disk 66. Thus, the magnetized strip 89 extends 180 degrees around the perimeter of the ferrite disk. Pulses or signal levels produced in each of these sextant pick-ups 86 to 88 by virtue of coupling with the magnetized strip 89 are employed in conjunction with pulses from the moveable stop pick-up 72 and the one degree pulses mentioned above to compute angular wind direction and quadrant. In addition, four orthogonally located start-stop spots 91 to 94 are formed on the disk 58 on a radius to magnetically couple with the pick-ups 72 and 75 only. The need for four such spots rather than one will be seen from the following description of the method and means of computing wind speed and direction described with reference to the remaining figures.

Figure 10:
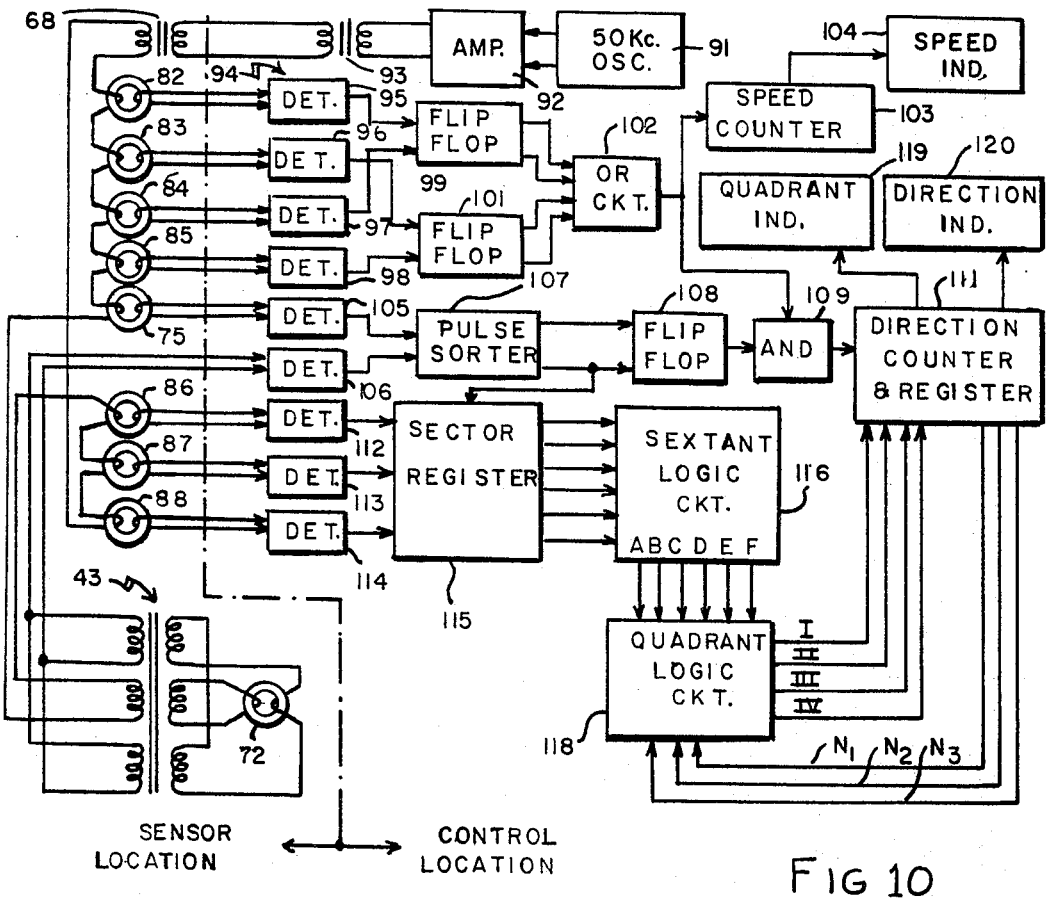
FIGURE 10 is an electrical block diagram showing the principal electrical components located at the wind sensor location and the principal electrical components located at the control location by which to compute from the pulses and signals transmitted therebetween the wind speed, direction and wind direction quadrant.
Figure 11:
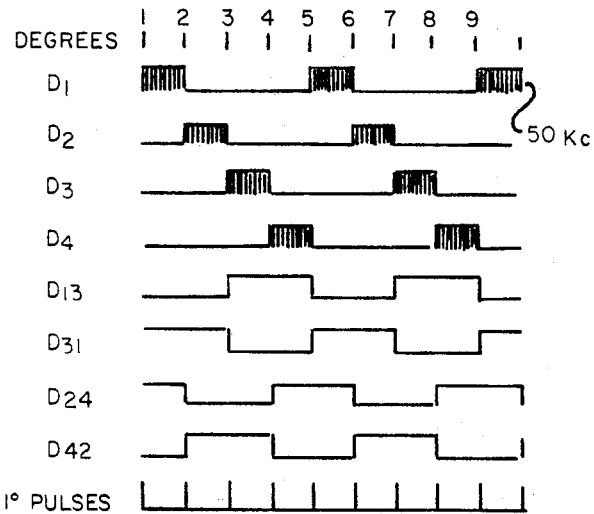
FIGURE 11 is a wave form diagram showing the sets of transmitted pulses D1 to D4 from which degree pulses are computed at the control location.

Turning next to FIGURE 10 there is shown an electrical diagram illustrating the principal parts located within the wind sensor transducer at the remote wind transducer location (to the left of the broken line) and at the control or computer location (to the right of the broken line). As shown in FIGURE 10, the four degree transformer pick-up cores 82 to 85, the start pick-up core 75, the stop pick-up core 73 and the three sextant pick-up cores 86 to 88 are all energized, via the input line transformer 68, from a high frequency source such as 50 kc. oscillator feeding an amplifier and transformer 92 and 93. The oscillator, amplifier and transformer 93 are preferably located at the control location and feed 50 kc. energy to the wind sensor at the remote location via the transmission line 44. The same transmission line also carries the multitude of outputs from the core transformer pick-ups each along separate wires denoted herein as separate channels. At the control location a bank of detectors 94 is provided each for detecting the pulse signals from a different one of the core pick-ups. The output of detectors 95 through 98 are denoted D1, D2, D3 and D4, respectively, and represent the pulses generated within the degree pick-up cores 82 to 85, respectively. The signal forms D1 to D4 are illustrated in diagrams of FIGURE 11 and energize a pair of bi-stable flip-flop circuits 99 to 101 producing output signals D13 and D24, respectively and their complements D31 and D42. These wave forms are also shown in wave form diagrams of FIGURE 11 and are differentiated at the input to OR circuit 102 so that the output of the OR circuit consists of the string of one degree spike pulses shown in FIGURE 11, each spike representing a rotation of the speed disk 55 through an angle of one degree. These one degree pulses are counted during a known cailbrated interval of time employing speed counter 103 which energizes the speed indicator 104. Thus, the wind velocity is computed and displayed.

The fixed start pick-up core 75 and the moveable stop pick-up core 72 provides signals to detectors 105 and 106 which produce four stop and four start pulses with each rotation of the disk 55 by virtue of coupling of the pick-up transformers 75 and 72 with the four start-stop spots 90a to 90d on the disc. Each of these start-stop spots are preferably of no longer duration than the interval between the one degree pulses and are fed to the pulse sorter circuit 107 which produces spikes coincident with the front edge thereof and these spikes are fed to bi-stable flip-flop circuit 108 producing a single output which controls the AND gate 109. Thus, the AND gate 109 is open during the interval following the pulse from pick-up 75 and before the occurrence of a pulse from pick-up 72. During this interval, the AND gate feeds the one degree pulses to direction counter and register 111. Thus, the direction counter counts pulses only during the interval between pulses from the pick-up transformers 75 and 72 and this count is a measure of wind direction within one of the four direction quadrants denoted $Q_I$, $Q_{II}$, $Q_{III}$ and $Q_{IV}$.

The ambiguity as to wind direction quadrant is resolved by signals from the three sextant pick-up cores 86 to 88 in conjunction with the stop pulses from sorter circuit 107 and the count stored in the register 111. The output windings from transformers 86 to 88 are fed through separate channels via the transmission cable 44 to detectors 112 and 114. The detectors 112 to 114 produce signal levels S1, S2 and S3, respectively, when the pick-up transformers 86 to 88 are opposite the magnetized portion 89 of the ferrite ring 66. The detectors also produce levels $\overline{S1}$, $\overline{S2}$, and $\overline{S3}$ when the respective cores are not opposite the magnetized strip of the ring 66. The output from the detectors 112 to 114 consisting of these six values sets the sector register 115. The sector register is cleared by stop pulses from the pulse sorter circuit 107 so that six outputs are produced from the register denoting the six signal levels S1 to S3 and $\overline{S1}$ to $\overline{S3}$ for each interval between stop pulses. The output of the sector register feeds the sextant logic circuit 116 which produces, along separate channels, the signals A to F representing the sextant or 60 degree sectors of the compass rose and these signals along with the output from register 111 are fed to the quadrant logic circuit 118 by which is determined the quadrant $Q_I$, $Q_{II}$, $Q_{III}$ or $Q_{IV}$ in which the wind direction lies.

Figure 9:
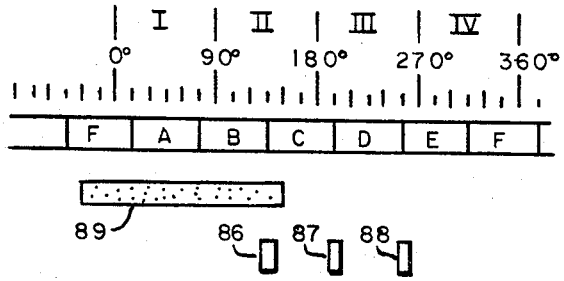
FIGURE 9 is a linear diagram illustrating the sextant markings on the disk in FIGURE 8 to show the cooperation between the spots and the pick-up cores which produce signals representing wind direction quadrants.
Figure 12:
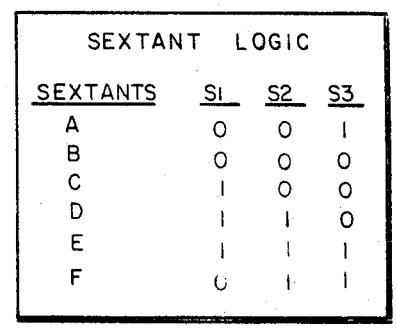
FIGURE 12 is a table showing the sextant logic by which the signals from the sextant pick-up cores are employed to determine the sextants.
Figure 13:
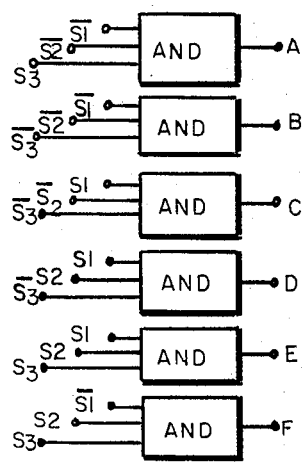
FIGURE 13 is a block diagram illustrating the principal parts of the sextant logic computer.
Figure 15:
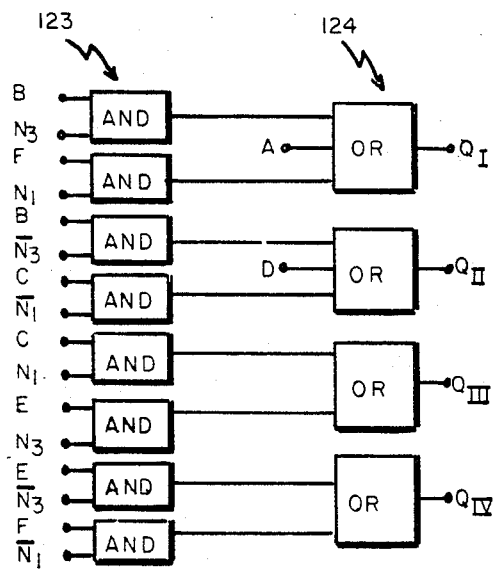
FIGURE 15 is a block diagram illustrating the principal parts of the quadrant logic computer.

The positional relationship between the sextant pick-up cores 86 to 88, the magnetized portion 89 of the disk 60, the six sextants A to F and the quadrants I to IV are illustrated by the diagram in FIGURE 9. The quadrants and degrees are fixed in space as are the sextant pick-ups 86 to 88 while the magnetized strip 89 moves relative to these just as the disk 65 rotates relative to the north direction and relative to the housing. The sextants A to F are fixed divisions relative to the housing and relate the housing position and the pick-ups 86 to 88 to the quadrants and degrees. Accordingly, it is first necessary to locate the position of the magnetized strip 89 relative to the sextants by employing signals S1, S2 and S3 and their complements and then, having determined the sextant, thereafter to compute the quadrant. FIGURE 12 is a table showing the sextant logic for computing the signals A to F and FIGURE 13 is a block diagram including six AND circuits 122 showing the principal components employed in such a computation to perform the functions of the sextant computer. The quadrant logic is illustrated by the table in FIGURE 14 and may be implemented by the circuit shown in FIGURE 15 to perform the functions of the quadrant logic circuit. This circuit includes eight AND circuits 123 and four OR circuits 124.

Figure 14:
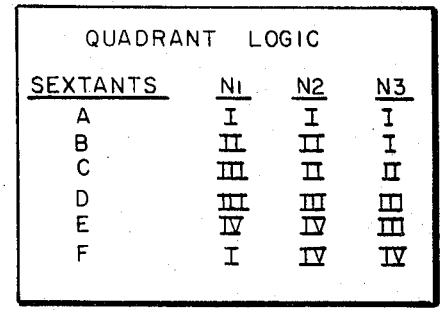
FIGURE 14 is a table showing the quadrant logic, whereby signals representative of sextant and various ranges of the direction count are employed to determine the wind direction quadrant.

In the quadrant logic table of FIGURE 14 it will be noted, there are required inputs to the quadrant logic circuit from the register 111. This register is preferably a parallel binary register which counts from 1 to 89. Thus, it counts the number of degrees in each quadrant. The signals denoted N1, N2 and N3 are defined as follows: N1 is any number in the register which is less than 32 and correspondingly $\overline{N1}$ is any number in the register greater than 32. N2 is any number in the register equal to or greater than 32, but less than 64 and $\overline{N2}$ is any number in the register other than this. Finally N3 is any number in the register equal to or greater than 64 and $\overline{N3}$ is any number in the register less than 64. Suitable circuitry for producing the signals N1 to N3 and $\overline{N1}$ to $\overline{N3}$ are obvious to any one skilled in the art and so the details of such circuits are not shown.

This completes a description of a number of embodiments of the present invention for providing a wind velocity and direction sensor which produces pulses which can be counted to yield numbers representative of wind velocity and direction through the cooperation of parts in the sensor which are driven in rotation and positioned by the wind and including judiciously selected spots on the rotated parts with which fixed and moveable spot detectors or pick-ups cooperate to produce the pulses. The specific embodiments described herein, however, are made by way of example of the numerous features of the invention and do not limit the spirit and scope of the invention as set forth in the accompanying claims in which:

1. A device for detecting the direction and velocity and flow of a fluid comprising:
   means coupled to said fluid which is driven in rotation at a speed related to the velocity of said fluid,
   means coupled to said fluid which is positioned in a direction related to the direction of flow of said fluid,
   a circular body driven in rotation by said first mentioned means,
   moveable detecting means positioned by said second mentioned means,
   fixed detecting means at a known directional position,
   suitable indices on said circular body which couple with said moveable and fixed detecting means when in registry therewith to produce count pulses and signals indicating a direction count interval,
   means coupled to said fixed detecting means for counting said pulses over any predetermined interval of time to produce a number representative of said velocity means coupled to said moveable and fixed detecting means for counting said pulses during said count interval to produce a number indicative of said direction relative to said known direction and means for indicating said numbers.

2. A device as in claim 1 and in which:
   said indices on said circular body include at least two different sets of indices, one set of which operates in conjunction with said fixed detectors to produce said count pulses, and
   the other set of which operates in conjunction with said fixed detector of known directional position and moveable detecting means to produce said signals indicating the direction count interval.

3. A device as in claim 2 and in which:
   said circular body carries a surface of magnetically permeable material,
   said first and second sets of indices constitute magnetic spots on said surface, and
   said fixed and moveable detecting means includes transformers which inductively couple with said magnetized spots.

4. A device as in claim 3 and in which:
   said transformers are energized from a source of carrier frequency located remote from the device, and
   said transformers produce pulses of said carrier frequency in response to magnetic coupling variation between said transformers and said magnetized spots.

5. A device as in claim 1 and further including:
   a second circular body driven in rotation by said second mentioned means,
   index means on said second circular body, and
   a plurality of additional fixed detecting means which couple with said index when in registry therewith or said second circular body to produce signals for resolving ambiguities in said number indicative of direction.

6. A device as in claim 5 and in which:
   said additional fixed detecting means constitutes three spaced detectors, any combination of which can be in registry with said index on said second circular body, the combination being indicative of the quadrant in which said direction of flow lies.

7. A device as in claim 5 and in which:
   said indices on said circular body include at least two different sets of indices, one set of which operates in conjunction with said fixed detectors to produce said count pulses, and
   the other set of which operates in conjunction with said fixed and moveable detecting means to produce said signals indicating the direction count interval.

8. A device as in claim 5 and in which:
   said second circular body carries a surface of magnetically permeable material,
   said first and second set of indices constitute magnetic spots on said first mentioned circular body, and
   said detecting means includes transformers which inductively couple with said megnetized surface and spots.

9. A device as in claim 8 and in which:
   said transformers are energized from a source of carrier frequency located remote from the device, and
   said transformers produce pulses of said carrier frequency in response to magnetic coupling variation between said transformers and said magnetized surface and spots.

10. A wind direction and velocity sensor comprising an anemometer attached to a speed shaft,
    a wind direction vane attached to a direction shaft,
    a housing for enclosing said shafts,
    whereby said shafts are free to rotate with respect to each other and with respect to the housing,
    a speed disk disposed within said housing attached to the end of said speed shaft,
    a direction disk within said housing attached to the end of said direction shaft,
    magnetically permeable coatings on at least a portion of each of said disks,
    a plurality of sets of spots of magnetized areas on said speed disk,
    a magnetized area on said direction disk subtending 180 degrees with the axis thereof,
    a plurality of fixed pick-up transformers carried by said housing in proximity with said magnetized spots and area at least one of which is at a known directional position,
    at least one moveable pick-up transformer carried by said direction shaft,
    whereby said pick-up transformers produce pulses and signals representative of increments of rotation of said speed disk and representative of intervals of time proportional to the directional position of said direction disk,
    means coupled to said pick-up transformers responsive to said signals and pulses for counting said pulses during a prescribed interval to produce a number representative of said wind velocity and for counting said pulses during said intervals proportional to direction to produce a number representative of wind direction relative to said known direction and means for indicating said numbers.

References Cited
UNITED STATES PATENTS
2,375,227  5/1945  Hillman _____ 73—189
3,068,692  12/1962  Morgan _____ 73—189
3,282,099  11/1966  Kingman _____ 73—189

RICHARD C. QUEISSER, *Primary Examiner.*

JERRY W. MYRACLE, *Assistant Examiner.*

U.S. Cl. X.R.

340—184